United States Patent
Bandai et al.

(10) Patent No.: US 8,757,249 B2
(45) Date of Patent: Jun. 24, 2014

(54) COOLING DEVICE INCLUDING A SOLAR RADIATION BLOCKING UNIT FOR A VEHICLE-MOUNTED ELECTRICAL APPARATUS

(75) Inventors: Hiroyuki Bandai, Toyota (JP);
Tomonari Taguchi, Toyota (JP);
Tatsuya Tsuduki, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1833 days.

(21) Appl. No.: 12/083,681

(22) PCT Filed: Oct. 18, 2006

(86) PCT No.: PCT/JP2006/321200
§ 371 (c)(1),
(2), (4) Date: Apr. 17, 2008

(87) PCT Pub. No.: WO2007/046539
PCT Pub. Date: Apr. 26, 2007

(65) Prior Publication Data
US 2009/0095449 A1     Apr. 16, 2009

(30) Foreign Application Priority Data
Oct. 21, 2005   (JP) .................................. 2005-307118
Nov. 25, 2005   (JP) .................................. 2005-340073

(51) Int. Cl.
*B60H 1/00*     (2006.01)
(52) U.S. Cl.
USPC ................................ 165/202; 165/41; 165/42

(58) Field of Classification Search
USPC ................... 165/41, 42, 43, 44, 202, 203, 204
See application file for complete search history.

(56) References Cited

U.S. PATENT DOCUMENTS

| 2,328,263 | A | * | 8/1943 | De Stefano | 296/95.1 |
|---|---|---|---|---|---|
| 2,837,018 | A | * | 6/1958 | Haltenberger | 296/93 |
| 3,146,019 | A | * | 8/1964 | Peyches | 296/96.14 |
| 3,715,966 | A | * | 2/1973 | Miettinen | 454/124 |
| 3,949,134 | A | * | 4/1976 | Willdorf | 428/215 |
| 4,004,126 | A | * | 1/1977 | Boaz | 165/41 |
| 4,081,300 | A | * | 3/1978 | Willdorf | 428/215 |

(Continued)

FOREIGN PATENT DOCUMENTS

| JP | A-61-027462 | 2/1986 |
|---|---|---|
| JP | A-61-181723 | 8/1986 |

(Continued)

OTHER PUBLICATIONS

"Instruction Manual for New-Model Vehicle;" Sep. 1, 2003, Toyota Jidosha Kabushiki Kaisha (partial translation).

*Primary Examiner* — Ljiljana Ciric
(74) *Attorney, Agent, or Firm* — Oliff PLC

(57) ABSTRACT

A cooling device for an electrical apparatus mounted on a rear side of a vehicle having a cooling airflow intake port in the vehicle interior at a lower section of a rear windshield, a supply unit which supplies a cooling airflow through the cooling airflow intake port to the electrical apparatus, a blocking unit for blocking solar radiation from coming onto the cooling airflow intake port through the rear windshield, and a control unit to control the blocking unit based on at least one of intensity of the solar radiation coming onto the cooling airflow intake port and a temperature of the cooling airflow.

10 Claims, 6 Drawing Sheets

(56) References Cited

U.S. PATENT DOCUMENTS

| | | | | |
|---|---|---|---|---|
| 4,261,649 A * | 4/1981 | Richard | | 359/614 |
| 4,280,330 A * | 7/1981 | Harris et al. | | 62/3.3 |
| 4,664,934 A | 5/1987 | Ito et al. | | |
| 4,788,904 A * | 12/1988 | Radtke | | 454/164 |
| 4,790,591 A * | 12/1988 | Miller | | 296/97.7 |
| 4,813,198 A * | 3/1989 | Johnston et al. | | 160/241 |
| 4,824,160 A * | 4/1989 | Fleming | | 296/97.4 |
| 4,909,044 A * | 3/1990 | Gudmundsen | | 165/43 |
| 4,920,759 A * | 5/1990 | Tanaka et al. | | 165/203 |
| 4,949,624 A * | 8/1990 | Hara et al. | | 165/43 |
| 4,986,592 A * | 1/1991 | Kaiser et al. | | 296/97.8 |
| 5,031,830 A * | 7/1991 | Ogino et al. | | 165/43 |
| 5,038,844 A * | 8/1991 | Edmonds et al. | | 160/370.21 |
| 5,059,254 A * | 10/1991 | Yaba et al. | | 136/251 |
| 5,072,105 A * | 12/1991 | Osawa | | 165/42 |
| 5,149,351 A * | 9/1992 | Yaba et al. | | 65/60.2 |
| 5,290,085 A * | 3/1994 | Takagi | | 296/95.1 |
| 5,292,168 A * | 3/1994 | Mykytiuk et al. | | 296/97.8 |
| 5,305,613 A * | 4/1994 | Hotta et al. | | 180/65.1 |
| 5,350,212 A * | 9/1994 | Corn | | 296/97.4 |
| 5,408,353 A * | 4/1995 | Nichols et al. | | 359/275 |
| 5,468,185 A * | 11/1995 | Truitt | | 454/198 |
| 5,524,446 A * | 6/1996 | Hotta et al. | | 165/43 |
| 5,537,831 A * | 7/1996 | Isaji et al. | | 62/244 |
| 5,624,003 A * | 4/1997 | Matsuki et al. | | 180/65.1 |
| 5,669,813 A * | 9/1997 | Jairazbhoy et al. | | 454/69 |
| 5,751,488 A * | 5/1998 | Wade | | 359/601 |
| 5,804,799 A * | 9/1998 | Stewart | | 219/528 |
| 5,860,466 A * | 1/1999 | Kao | | 160/370.22 |
| 5,937,664 A | 8/1999 | Matsuno et al. | | |
| 5,950,710 A * | 9/1999 | Liu | | 165/41 |
| 6,094,927 A | 8/2000 | Anazawa et al. | | |
| 6,186,886 B1 * | 2/2001 | Farrington et al. | | 454/75 |
| 6,267,431 B1 * | 7/2001 | Watkins | | 296/97.4 |
| 6,497,275 B1 * | 12/2002 | Elliot | | 165/204 |
| 6,609,747 B1 * | 8/2003 | Ruiz | | 296/95.1 |
| 6,692,130 B1 * | 2/2004 | Snow | | 454/137 |
| 6,705,381 B2 * | 3/2004 | Huang | | 160/370.23 |
| 6,808,450 B2 * | 10/2004 | Snow | | 454/137 |
| 6,931,878 B2 * | 8/2005 | Kubota et al. | | 62/244 |
| 6,966,498 B2 * | 11/2005 | Huang et al. | | 165/202 |
| 7,013,659 B2 * | 3/2006 | Yoshida et al. | | 429/62 |
| 7,025,159 B2 * | 4/2006 | Smith et al. | | 180/68.1 |
| 7,108,307 B1 * | 9/2006 | Sahara et al. | | 296/97.4 |
| 7,149,026 B2 * | 12/2006 | Schmitt et al. | | 359/265 |
| 7,152,417 B2 * | 12/2006 | Morishita et al. | | 62/186 |
| 7,216,917 B2 * | 5/2007 | Tadakamalla | | 296/97.4 |
| 7,275,983 B2 * | 10/2007 | Aoki et al. | | 454/75 |
| 7,441,414 B2 * | 10/2008 | Ziehr et al. | | 62/244 |
| 7,451,608 B2 * | 11/2008 | Kikuchi | | 62/244 |
| 7,461,887 B1 * | 12/2008 | Federle et al. | | 296/97.4 |
| 7,641,545 B2 * | 1/2010 | Chen et al. | | 454/212 |
| 7,658,670 B1 * | 2/2010 | Brown | | 454/128 |
| 7,735,331 B2 * | 6/2010 | Zhu et al. | | 361/695 |
| 7,997,966 B2 * | 8/2011 | Yoda | | 361/695 |
| 2004/0010357 A1 | 1/2004 | Kubota et al. | | |
| 2004/0076015 A1 | 4/2004 | Aoki et al. | | |
| 2004/0107713 A1 | 6/2004 | Aoki | | |
| 2004/0176021 A1 * | 9/2004 | Mills | | 454/143 |
| 2005/0028542 A1 | 2/2005 | Yoshida et al. | | |
| 2005/0267646 A1 * | 12/2005 | Ichishi et al. | | 165/204 |
| 2006/0042788 A1 * | 3/2006 | Naruse et al. | | 165/202 |
| 2007/0131782 A1 * | 6/2007 | Ziehr et al. | | 236/1 B |
| 2007/0221371 A1 * | 9/2007 | Ichikawa et al. | | 165/204 |
| 2009/0038774 A1 * | 2/2009 | Ogiso et al. | | 165/42 |
| 2009/0078782 A1 * | 3/2009 | Phillippo | | 165/202 |
| 2011/0048671 A1 * | 3/2011 | Nishikawa et al. | | 165/42 |
| 2011/0160958 A1 * | 6/2011 | Shiroyama et al. | | 165/203 |

FOREIGN PATENT DOCUMENTS

| | | |
|---|---|---|
| JP | A-06-067217 | 3/1994 |
| JP | 7-33720 | 6/1995 |
| JP | A-08-207569 | 8/1996 |
| JP | A-11-180168 | 7/1999 |
| JP | A-11-180186 | 7/1999 |
| JP | 3067416 U | 4/2000 |
| JP | A-2002-223507 | 8/2002 |
| JP | A-2004-114900 | 4/2004 |
| JP | A-2004-123011 | 4/2004 |
| JP | A-2004-161058 | 6/2004 |
| JP | A-2004-306726 | 11/2004 |
| JP | A-2005-186868 | 7/2005 |
| WO | WO 2005/092650 A1 | 10/2005 |

* cited by examiner

F I G. 1
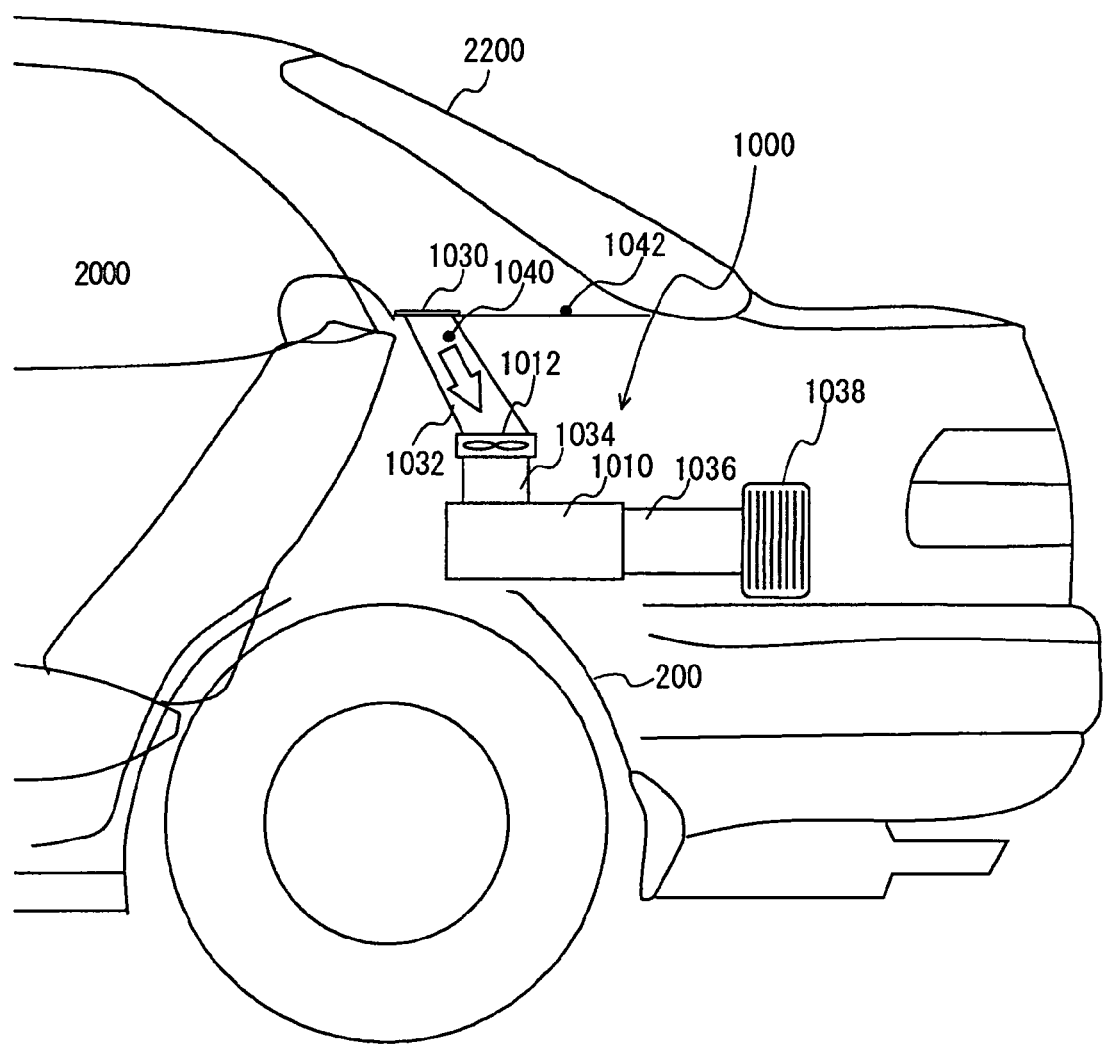

F I G. 4
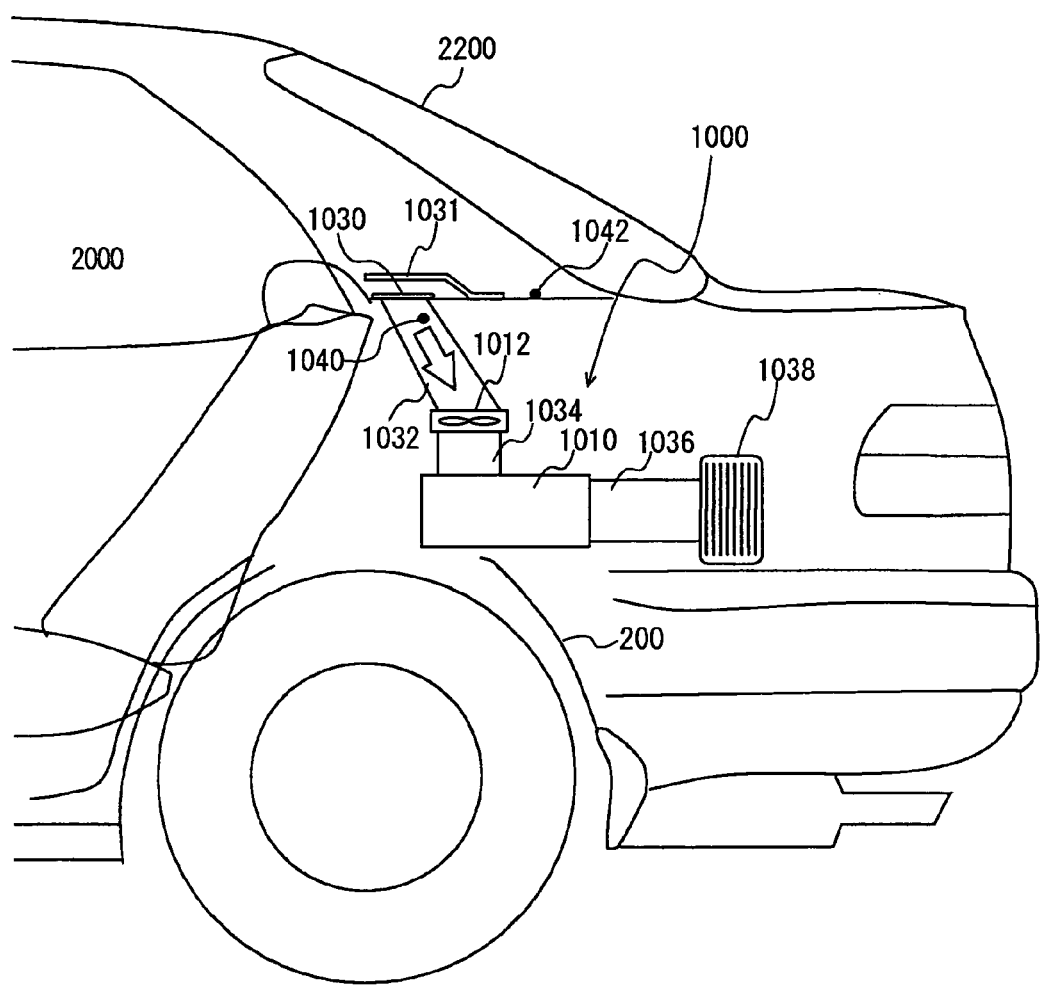

COOLING DEVICE INCLUDING A SOLAR RADIATION BLOCKING UNIT FOR A VEHICLE-MOUNTED ELECTRICAL APPARATUS

TECHNICAL FIELD

The present invention relates to a cooling device for an electrical apparatus (a power storage mechanism, a semiconductor element for power conversion, and others) mounted on a vehicle, and particularly relates to a cooling device which cools an electrical apparatus mounted on a rear side of the vehicle, by drawing in air in a vehicle interior through an intake port provided in the vehicle interior in proximity to a rear windshield.

BACKGROUND ART

Vehicles each mounted with a power train referred to as a hybrid system formed of a combination of an internal combustion engine (e.g. the use of a known engine such as a petrol engine or a diesel engine is considered.) and an electric motor, have been developed and brought into practical use. Such a vehicle is mounted with electrical apparatuses, for example, a power storage mechanism such as a secondary battery or a capacitor for driving an electric motor used for traveling, and an apparatus for power conversion such as an inverter or a DC/DC converter. The secondary battery is charged and discharged through a chemical reaction that involves heat generation, and hence requires cooling. Furthermore, the inverter and the DC/DC converter have a power element that evolves heat, and hence requires cooling. Generally, an electrical apparatus requires cooling because when a current flows through a power line, Joule heat is generated.

Such an electrical apparatus may be placed, for example, between a vehicle rear seat and a luggage room. The electrical apparatus is placed in a duct-like casing that forms an air passage. A cooling fan generating a cooling airflow for cooling the electrical apparatus is placed between the electrical apparatus and the rear seat, on an intake air upstream side of the electrical apparatus in the casing. An upstream end portion of the casing is brought in communication with the vehicle interior (specifically, opens at a rear package tray), so that the electrical apparatus is cooled with air in the vehicle interior.

The inverter and the DC/DC converter may be integrated into an electrical apparatus referred to as a PCU (Power Control Unit), and mounted on the vehicle. The PCU may also be placed as an electrical apparatus between the vehicle rear seat and the luggage room.

A hybrid vehicle must be mounted with such an electrical apparatus along with an engine. Japanese Patent Laying-Open No. 2004-161058 discloses a battery cooling duct capable of reliably releasing a hydrogen gas or the like that may possibly be generated at a battery mounted on the vehicle to the outside of the vehicle. The battery cooling duct disclosed in this publication is applied to a vehicle mounted with a battery. The battery cooling duct includes a communicating passage that brings the battery in communication with a vehicle interior of the vehicle, and a gas retaining unit provided at the communicating passage.

With this battery duct, a hydrogen gas or the like generated at the battery can temporarily be stored in the gas retaining unit, and hence it is possible to reduce or prevent an entry of the gas into the vehicle interior.

Furthermore, Japanese Patent Laying-Open No. 2005-186868 discloses a cooling device for a power storage mechanism, capable of suppressing effects on an in-vehicle space and a pressure loss. The cooling device for the power storage mechanism disclosed in this publication includes an ejection unit that ejects air heated by heat exchange with the power storage mechanism from the power storage mechanism to the in-vehicle space, and an ejection fan that ejects the air heated by heat exchange from the in-vehicle space to the outside of the vehicle.

With the cooling device for the power storage mechanism, the air heated by heat exchange with the power storage mechanism is ejected from the power storage mechanism to the in-vehicle space. This air is then ejected from the in-vehicle space to the outside of the vehicle by the ejection fan. It is thereby possible to eject the air heated by heat exchange to the outside of the vehicle, without additionally providing an exhaust duct leading from the power storage mechanism to the outside of the vehicle and bypassing the in-vehicle space. Accordingly, it is possible to suppress effects on the in-vehicle space and a pressure loss.

In vehicles mounted with the devices disclosed in Japanese Patent Laying-Open No. 2004-161058 and Japanese Patent Laying-Open No. 2005-186868, if an electrical apparatus is mounted on a rear side of the vehicles and cooled with air in the vehicle interior, a cooling airflow intake port may be provided at the rear package tray.

However, if the intake port is provided at the rear package tray, the intake port is located in proximity to a rear windshield and irradiated with infrared rays of sunlight, causing a temperature rise of air in proximity to the intake port. Therefore, a temperature of the cooling airflow rises, and thus the electrical apparatus cannot efficiently be cooled.

DISCLOSURE OF THE INVENTION

The present invention has been made to solve the above-described problems. An object of the present invention is to provide a cooling device for an electrical apparatus, which can preferably be applied to a vehicle having the electrical apparatus mounted on its rear side, and has excellent cooling efficiency.

A cooling device according to an aspect of the present invention cools an electrical apparatus mounted on a rear side of a vehicle. The cooling device includes: a cooling airflow intake port which is provided in a vehicle interior in proximity to a rear windshield; a supply unit which supplies a cooling airflow through the cooling airflow intake port to the electrical apparatus; and a blocking unit which blocks solar radiation coming onto the cooling airflow intake port through the rear windshield.

According to the present invention, even if the air intake port is provided in the vehicle interior in proximity to the rear windshield, and the cooling airflow reaches a high temperature under the effect of the solar radiation coming through the rear windshield, the blocking unit blocks the solar radiation, so that it is possible to reduce the effect of the solar radiation and avoid a significant temperature rise of the cooling airflow, and efficiently cool the electrical apparatus. Consequently, it is possible to provide a cooling device for an electrical apparatus, which is preferably applied to a vehicle having an electrical apparatus mounted on its rear side and has excellent cooling efficiency.

Preferably, the blocking unit is implemented by the rear windshield made of infrared rays cutoff glass.

According to the present invention, the rear windshield is configured with infrared rays cutoff glass, so that it is possible to reduce the effect of the solar radiation coming through the rear windshield. Therefore, it is possible to avoid a significant temperature rise of the cooling airflow and efficiently cool the electrical apparatus mounted on the rear side of the vehicle.

More preferably, the blocking unit is implemented by a member which covers the cooling airflow intake port.

According to the present invention, the cooling airflow intake port is covered with the member, and hence the cooling airflow intake port is not directly irradiated with solar radiation. Therefore, it is possible to reduce the effect of the solar radiation coming through the rear windshield and avoid a significant temperature rise of the cooling airflow, and hence efficiently cool the electrical apparatus mounted on the rear side of the vehicle.

More preferably, the blocking unit is implemented by a sunshade plate which is provided at the rear windshield on a side of the vehicle interior, an operation of the sunshade plate being controllable. The cooling device further includes a control unit which controls the sunshade plate based on at least one of severity of the solar radiation coming onto the cooling airflow intake port and a temperature of the cooling airflow.

According to the present invention, an electrically-powered rear sunshade that uses a motor or the like as an actuator is provided as the blocking unit. The control unit controls the motor such that when severity of the solar radiation coming onto the cooling airflow intake port is high or the temperature of the cooling airflow is high, the electrically-powered rear sunshade is closed. Therefore, when the temperature of the cooling airflow is actually high and the high temperature is caused by solar radiation, it is possible to operate the blocking unit and reduce the effect of the solar radiation coming through the rear windshield. Therefore, it is possible to avoid a significant temperature rise of the cooling airflow and efficiently cool the electrical apparatus mounted on the rear side of the vehicle.

More preferably, the blocking unit is implemented by the rear windshield made of light control glass, an amount of infrared light transmitting through the light control glass being controllable. The cooling device further includes a control unit which controls the amount of the infrared light transmitting through the light control glass based on at least one of severity of the solar radiation coming onto the cooling airflow intake port and a temperature of the cooling airflow.

According to the present invention, there is used as the blocking unit a rear windshield darkened by controlling a voltage supplied to an electrochromic material sealed in the rear windshield. The control unit controls the voltage such that when severity of the solar radiation coming onto the cooling airflow intake port is high or the temperature of the cooling airflow is high, the rear windshield is darkened. Therefore, when the temperature of the cooling airflow is actually high, and the high temperature is caused by solar radiation, it is possible to operate the blocking unit and reduce the effect of the solar radiation coming through the rear windshield. Therefore, it is possible to avoid a significant temperature rise of the cooling airflow and efficiently cool the electrical apparatus mounted on the rear side of the vehicle.

More preferably, the electrical apparatus is a power storage mechanism.

According to the present invention, it is possible to efficiently cool a secondary battery or a capacitor mounted on the rear side of the vehicle and serving as the power storage mechanism.

More preferably, the electrical apparatus is a semiconductor element for power conversion.

According to the present invention, it is possible to efficiently cool the semiconductor element for power conversion such as an inverter or a DC/DC converter, mounted on the rear side of the vehicle.

More preferably, the cooling airflow intake port is provided at a rear package tray.

According to the present invention, it is possible to efficiently cool the electrical apparatus mounted on the rear side of the vehicle by avoiding a significant temperature rise in proximity to the cooling airflow intake port provided at the rear package tray.

More preferably, the vehicle is a vehicle mounted with two types of mechanical power sources.

According to the present invention, it is possible to provide a cooling device suitably used in a hybrid vehicle mounted with two types of mechanical power sources.

A cooling device according to another aspect of the present invention cools an electrical apparatus mounted on a rear side of a vehicle. The cooling device includes: a cooling airflow intake port which is provided in a vehicle interior in proximity to a rear windshield; a supply unit which supplies a cooling airflow through the cooling airflow intake port to the electrical apparatus; and a reflecting unit which reflects solar radiation coming onto the cooling airflow intake port through the rear windshield.

According to the present invention, even if the air intake port is provided in the vehicle interior in proximity to the rear windshield, and the cooling airflow reaches a high temperature under the effect of the solar radiation coming through the rear windshield, the reflecting unit reflects the solar radiation (infrared light included therein), so that it is possible to reduce the effect of the solar radiation and avoid a significant temperature rise of the cooling airflow, and efficiently cool the electrical apparatus. Consequently, it is possible to provide a cooling device for an electrical apparatus, which is preferably applied to a vehicle having an electrical apparatus mounted on its rear side, and has excellent cooling efficiency.

Preferably, the reflecting unit is implemented by a member which is provided at least in proximity to the cooling airflow intake port and reflects infrared rays included in the solar radiation.

According to the present invention, the infrared rays included in the solar radiation are reflected, and hence it is possible to reduce the effect of the solar radiation coming through the rear windshield. Therefore, it is possible to avoid a significant temperature rise of the cooling airflow and efficiently cool the electrical apparatus mounted on the rear side of the vehicle.

More preferably, the cooling airflow intake port is provided at a rear package tray. The reflecting unit is implemented by a member which is provided at the rear package tray and reflects infrared rays included in the solar radiation.

According to the present invention, the infrared rays included in the solar radiation can be reflected by the infrared rays reflecting member provided at the rear package tray. Therefore, it is possible to reduce the effect of the solar radiation coming through the rear windshield and avoid a significant temperature rise of the cooling airflow, and efficiently cool the electrical apparatus mounted on the rear side of the vehicle. Note that the infrared rays reflecting member may be provided at the entire surface of the rear package tray, or may be provided only in proximity to the cooling airflow intake port.

More preferably, the reflecting unit is implemented by a white, plate-like member.

According to the present invention, the white, plate-like member having a high infrared rays reflectivity is used for the reflecting unit, so that a significant temperature rise of the air in proximity to the cooling airflow intake port is efficiently avoided. Additionally, the member, which is a plate-like member, requires no large mounting space.

More preferably, the reflecting unit is implemented by a mirrored, plate-like member.

According to the present invention, a mirrored, plate-like member having a high infrared rays reflectivity is used for the reflecting unit, so that a significant temperature rise of the air in proximity to the cooling airflow intake port is efficiently avoided. Additionally, the member, which is a plate-like member, requires no large mounting space.

BRIEF DESCRIPTION OF THE DRAWINGS

FIG. 1 is a diagram of a cooling device for a vehicle according to a first embodiment of the present invention, mounted on the vehicle.

FIG. 4 is a diagram of a cooling device for a vehicle according to a modification of the first embodiment of the present invention, mounted on the vehicle.

BEST MODES FOR CARRYING OUT THE INVENTION

First Embodiment

Figure 2:
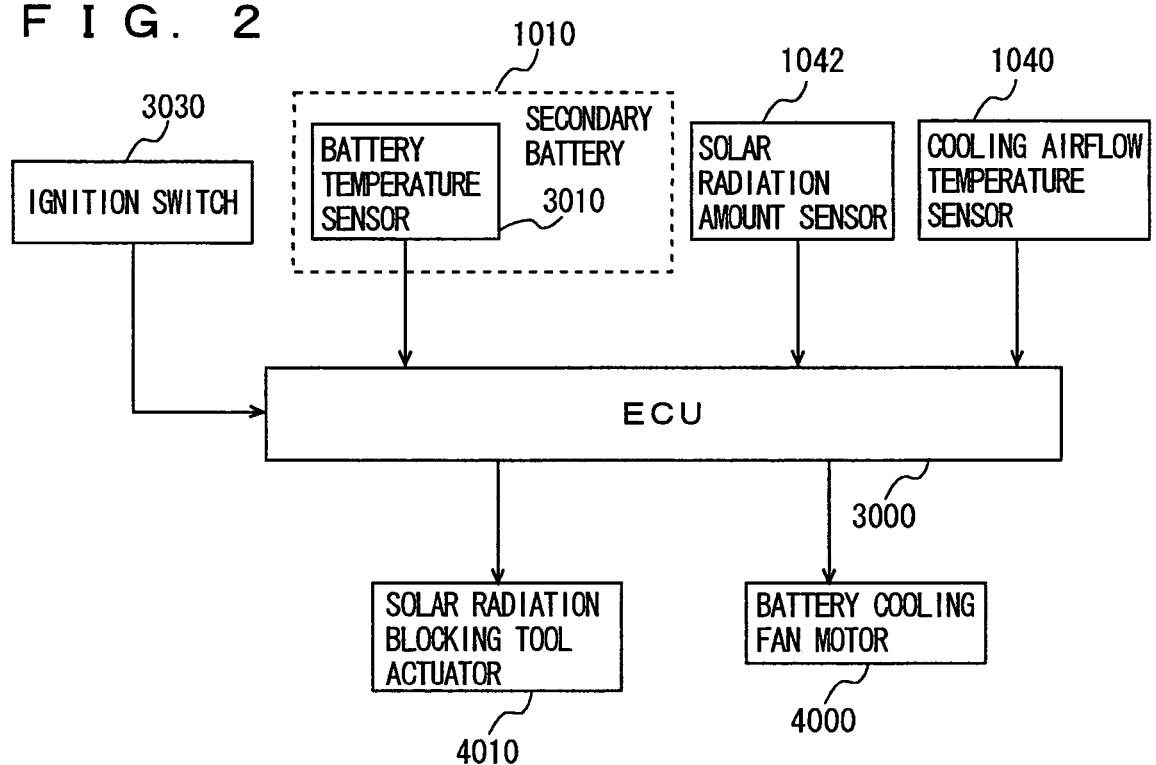
FIG. 2 is a control block diagram for the cooling device for the vehicle according to the first embodiment of the present invention.

Embodiments of the present invention will hereinafter be described with reference to the drawings. In the following description, the same parts are provided with the same reference characters, and have the same names and functions. Therefore, the detailed description thereof will not be repeated. Note that although the following description is made on a cooling device for a vehicle which cools a secondary battery, which is an example of power storage mechanisms, as an electrical apparatus, the present invention is not limited thereto. The power storage mechanism may be a capacitor, instead of a secondary battery. The electrical apparatus may be a PCU including an inverter, a DC/DC converter, and the like, instead of a power storage mechanism (a secondary battery, a capacitor, and the like). In the following description, it is assumed that the vehicle is a hybrid vehicle that uses an engine and a motor as driving sources. However, the vehicle may be an electric vehicle (EV) (a power supply for the EV is not limited).

FIG. 1 shows a diagram of a cooling device 1000 for a vehicle according to the present embodiment, mounted on the vehicle. As shown in FIG. 1, cooling device 1000 for the vehicle is installed in a trunk room (a space other than a passenger space) on a rear side of the vehicle with respect to a vehicle interior space (the passenger space) 2000. In addition, cooling device 1000 for the vehicle is provided at approximately the central portion in a width direction of the vehicle to avoid tire houses 200 located on opposite sides in the width direction of the vehicle.

Cooling device 1000 for the vehicle includes a secondary battery (a nickel-hydrogen battery or a lithium-ion battery) 1010 that can be charged and discharged and serves as a driving source for the vehicle, and a cooling fan 1012 for secondary battery 1010.

For example, secondary battery 1010 is configured as a battery pack in which multiple (20-30) battery modules are connected in series, each of battery modules being formed by connecting six prismatic battery cells (each of which normally has an output voltage of approximately 1.2 V) in series. As an example, an exterior size of secondary battery 1010 is such that secondary battery 1010 is accommodated inside a rear side member in the vehicle width direction.

Cooling device 1000 for the vehicle cools secondary battery 1010 by allowing air in vehicle interior space 2000 to be drawn in by cooling fan 1012 through an inlet port 1030 and through a duct 1032, to thereby be supplied through a duct 1034 to secondary battery 1010. The exhaust airflow that has cooled secondary battery 1010 passes through a duct 1036 and is ejected to the outside of the vehicle interior through an outlet port 1038.

Inlet port 1030 is opened at a rear package tray (a member where a loudspeaker or the like of an audio system is usually provided) located at a lower section of a rear windshield 2200. In other words, duct 1032 is placed to extend from an upside to a downside as shown in FIG. 1, so that the air in the vehicle interior flows from the upside to the downside as shown by an arrow in FIG. 1. The air in the vehicle interior is drawn in by cooling fan 1012 toward secondary battery 1010 (and flows among the battery modules). The air that has cooled secondary battery 1010 is then ejected to the outside of the vehicle through outlet port 1050 formed on the rear side of secondary battery 1010.

Duct 1032 is provided with a cooling airflow temperature sensor 1040 sensing a temperature of the cooling airflow, and the rear package tray is provided with a solar radiation amount sensor 1042 sensing an amount of solar radiation reaching the vehicle interior through rear windshield 2200. Note that solar radiation amount sensor 1042 is not particularly limited as long as it is the one sensing a physical quantity having a correlation with an amount of infrared rays included in sunlight. In the following, it is assumed that solar radiation amount sensor 1042 senses a physical quantity that has a correlation with an amount of infrared rays, and senses a solar radiation intensity SUN obtained by converting the physical quantity.

With reference to FIG. 2, there will be described a control block diagram for cooling device 1000 for the vehicle in FIG. 1. As shown in FIG. 2, cooling device 1000 for the vehicle is controlled by an ECU (Electronic Control Unit) 3000.

To ECU 3000, each of signals sensed by a battery temperature sensor 3010 provided at secondary battery 1010 and sensing a temperature (representing a temperature of secondary battery 1010), cooling airflow temperature sensor 1040, and solar radiation amount sensor 1042, respectively, is input as a current value or a voltage value. Furthermore, ECU 3000 converts analog signals input from these sensors through an input interface and each showing a current value or a voltage value, into digital signals to facilitate processing of these signals at a CPU (Central Processing Unit) in ECU 3000.

If a desired condition is satisfied in accordance with a program described below, ECU 3000 outputs an operation command signal to a battery cooling fan motor 4000. Battery cooling fan motor 4000 rotates cooling fan 1012, so that secondary battery 1010 is cooled.

ECU 3000 receives from an ignition switch 3030 a READY-ON signal indicating a state in which traveling with the use of secondary battery 1010 is enabled. When the operation command signal described below is output to cooling fan motor 4000, battery cooling fan motor 4000 is operated normally in a READY-ON state.

Figure 3:
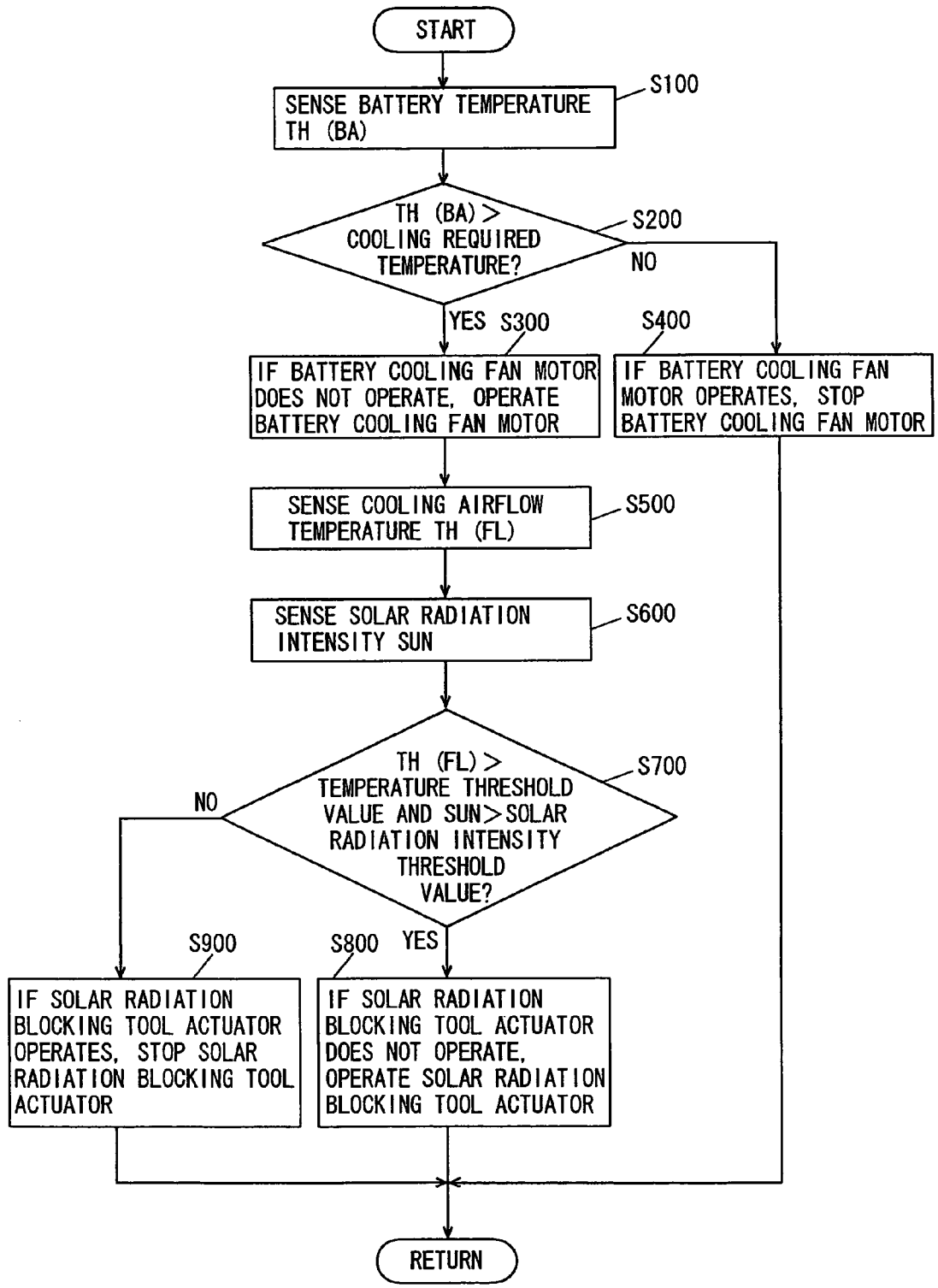
FIG. 3 is a flowchart showing a control structure of a program executed by an ECU in FIG. 2.

With reference to FIG. 3, there will be described a control structure of the program executed by ECU 3000 that controls the cooling device for the vehicle according to the present embodiment. Note that the program shown below is repeatedly executed when brought into the READY-ON state. Although operation and stoppage of battery cooling fan motor 4000 are controlled in the READY-ON state in the program shown below, battery cooling fan motor 4000 may continuously be operated in the READY-ON state without being stopped.

In step (hereinafter abbreviated as S) 100, ECU 3000 senses a battery temperature TH (BA). In S200, ECU 3000 determines whether battery temperature TH (BA) is higher than a cooling required temperature or not. If battery temperature TH (BA) is higher than the cooling required temperature (YES in S200), the process is moved to S300. If not so (NO in S200), the process is moved to S400.

In S300, if battery cooling fan motor 4000 does not operate, ECU 3000 outputs to battery cooling fan motor 4000 an operation command signal for operating battery cooling fan motor 4000. After the process in S300, the process is moved to S500.

In S400, if battery cooling fan motor 4000 operates, ECU 3000 stops an output of the operation command signal being output to battery cooling fan motor 4000 so as to stop battery cooling fan motor 4000. After the process in S400, the process terminates.

In S500, ECU 3000 senses a cooling airflow temperature TH (FL). In S600, ECU 3000 senses solar radiation intensity SUN. Assume that a value of solar radiation intensity SUN is proportional to an amount of received infrared rays as described above.

In S700, ECU 3000 determines whether or not cooling airflow temperature TH (FL) is higher than a temperature threshold value and solar radiation intensity SUN is higher than a solar radiation intensity threshold value. If cooling airflow temperature TH (FL) is higher than the temperature threshold value and solar radiation intensity SUN is higher than the solar radiation intensity threshold value (YES in S700), the process is moved to S800. If not so (NO in S700), the process is moved to S900.

In S800, if the solar radiation blocking tool actuator does not operate, ECU 3000 outputs to the solar radiation blocking tool actuator an operation command signal for operating the actuator. After the process in S800, the process terminates.

In S900, if the solar radiation blocking tool actuator operates, ECU 3000 stops an output of the operation command signal being output to the solar radiation blocking tool actuator so as to stop the solar radiation blocking tool actuator. After the process in S900, the process terminates.

The solar radiation blocking tool in S800 and S900 will be described. As an example of the solar radiation blocking tool, the two cases will be described in the following.

(1) As the solar radiation blocking tool, a rear sunshade (sunshade plate) is provided at rear windshield 2200 on a side of the vehicle interior, opening and closing operations of the rear sunshade being controllable. The opening and closing operations of the rear sunshade are performed by a mechanical power of the motor. If ECU 3000 outputs to the motor the operation command signal for blocking solar radiation, the rear sunshade is closed. If ECU 3000 stops an output of the operation command signal, the rear sunshade is opened.

(2) As the solar radiation blocking tool, rear windshield 2200 is implemented by light control glass, an amount of infrared light transmitting through the light control glass being controllable. As to such light control glass, infrared light transmitting through the rear windshield is adjusted by applying a desired voltage to an electrochromic material applied to an inner side of rear windshield 2200, or to an electrochromic material sealed in between laminated glasses that configure rear windshield 2200. If ECU 3000 outputs to the electrochromic material an operation command signal for blocking solar radiation, the electrochromic material is darkened, and an amount of infrared rays transmitting therethrough is decreased. If ECU 3000 stops an output of the operation command signal, the darkened electrochromic material becomes transparent, and an amount of infrared rays transmitting therethrough is increased.

There will be described an operation of cooling device 1000 for the vehicle according to the present embodiment, based on the above-described structure and flowchart.

If the vehicle is brought into the READY-ON state, a temperature of secondary battery 1010, namely, battery temperature TH (BA) is sensed (S100). If temperature TH (BA) is higher than a predetermined cooling required temperature (YES in S200) (and if battery cooling fan motor 4000 does not operate), an operation command signal is output to battery cooling fan motor 4000 (S300).

Note that the process in S300 may be executed regardless of whether battery cooling fan motor 4000 operates or not. In this case, if the process in S300 is executed when battery cooling fan motor 4000 operates, control is merely provided such that the operation command signal being output by ECU 3000 to battery cooling fan motor 4000 is output again. The same applies to S400.

During an operation of battery cooling fan motor 4000, cooling airflow temperature TH (FL) is sensed (S500), and solar radiation intensity SUN is sensed (S600).

If secondary battery 1010 operates under the scorching sun during the day in midsummer, for example, it is determined that cooling airflow temperature TH (FL) is higher than the temperature threshold value and solar radiation intensity SUN is higher than the solar radiation intensity threshold value (YES in S700). In such a case, the solar radiation blocking actuator is operated to cause closure of the rear sunshade or application of a voltage to the electrochromic material to darken the same (S800). As such, if the solar radiation blocking actuator is operated, an amount of infrared rays irradiating air intake port 1030 is decreased, and hence it is possible to suppress a temperature rise in the vehicle interior in proximity to air intake port 1030. Accordingly, it is possible to avoid a significant temperature rise of the cooling airflow to secondary battery 1010.

Note that the process in S800 may be executed regardless of whether the solar radiation blocking actuator operates or not. In this case, if the process in S800 is executed when the solar radiation blocking actuator operates, control is merely provided such that the operation command signal being output by ECU 3000 to the solar radiation blocking actuator is output again. The same applies to S900.

As described above, with the cooling device for the vehicle according to the present embodiment, even if the air intake port is provided in proximity to the rear windshield, and is under the effect of solar radiation, it is possible to reduce the effect of solar radiation and avoid a significant temperature rise of the cooling airflow, and efficiently cool the electrical apparatus mounted on the rear side of the vehicle.

Note that temperature TH (BA) of secondary battery 1010 may be added to the conditions for the process in S700.

Alternatively, one of cooling airflow temperature TH (FL) and solar radiation intensity SUN may be used as the condition for the process in S700.

Furthermore, although the solar radiation blocking tool is controlled by ECU 3000 in the above-described embodiment, an uncontrollable solar radiation blocking tool as described below may be provided.

(A) The solar radiation blocking tool is implemented by rear windshield 2200 made of infrared rays cutoff glass.

(B) As described in FIG. 4, the solar radiation blocking tool is implemented by a solar radiation shield plate 1031 that covers intake port 1030.

Second Embodiment

Figure 5:
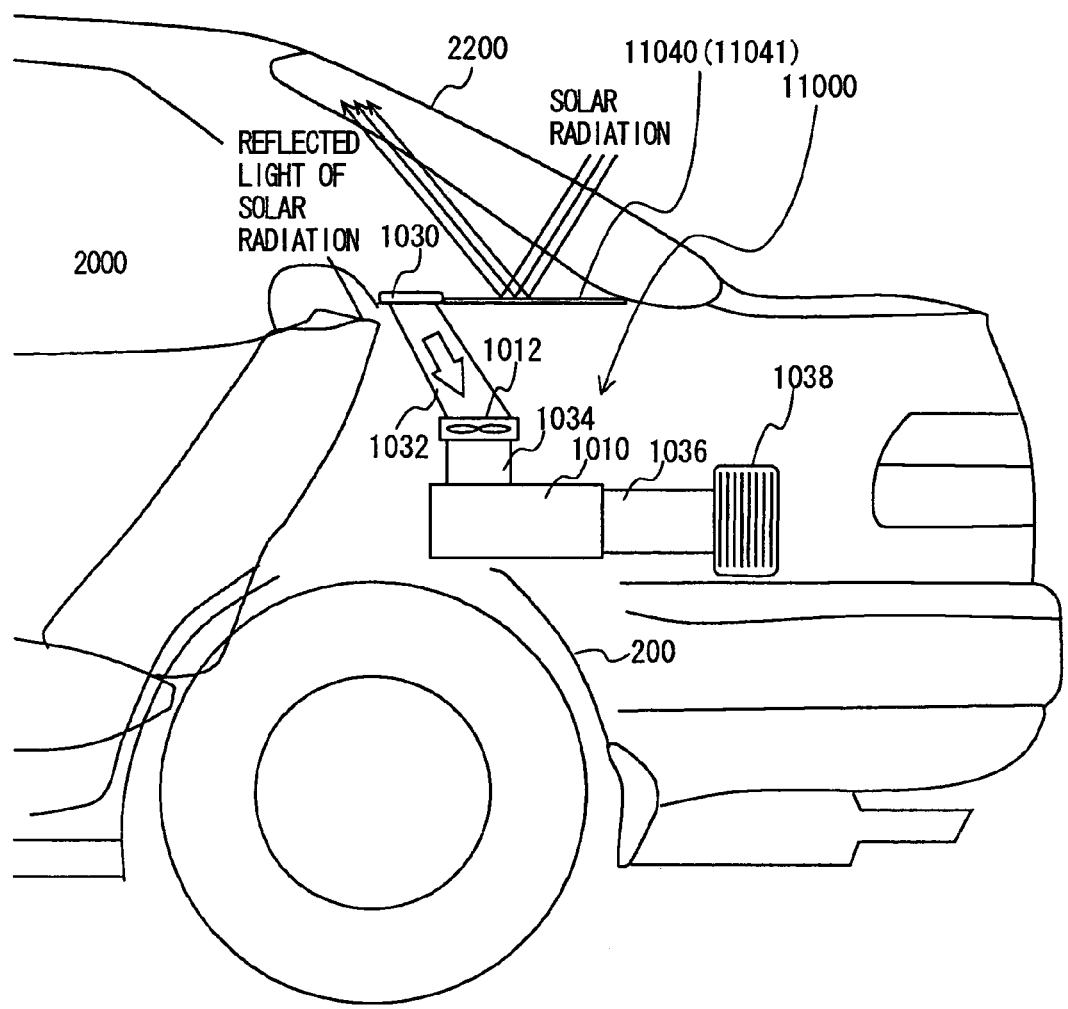
FIG. 5 is a diagram of a cooling device for a vehicle according to a second embodiment of the present invention, mounted on the vehicle.

FIG. 5 shows a diagram of a cooling device 11000 for a vehicle according to the present embodiment, mounted on the vehicle. Note that the same structures shown in FIG. 5, as those shown in FIG. 1, are provided with the same reference characters, and have the same structures and functions. Accordingly, the detailed description thereof will not be repeated herein.

With reference to FIG. 5 along with FIGS. 6 and 7, there will be described a reflector plate which is a plate-like member provided at the rear package tray and reflecting infrared rays included in solar radiation.

Figure 6:
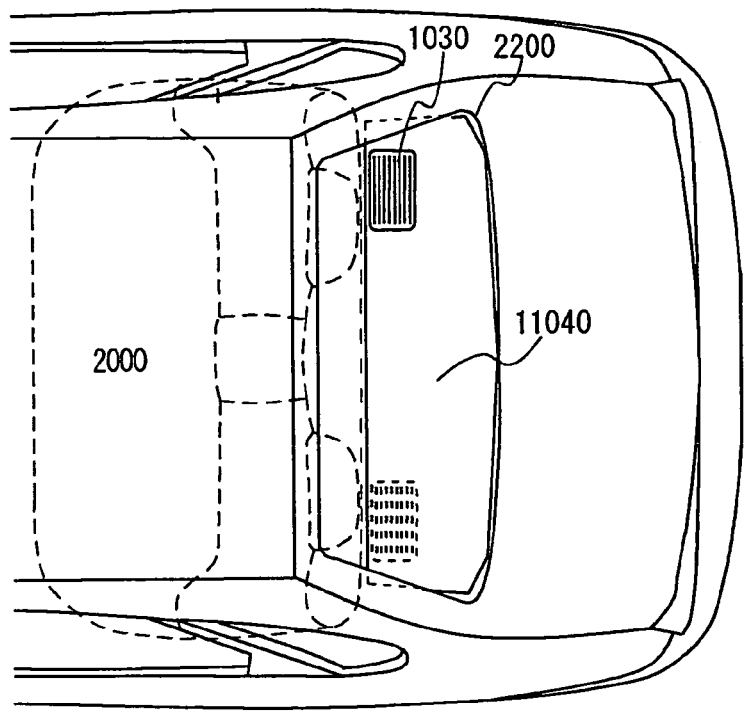
FIGS. 6 and 7 are top views of FIG. 5.

As shown in FIGS. 5 and 6, a reflector plate 11040 is provided at the entire surface of the rear package tray. Reflector plate 11040 is a plate-like member that has a shape corresponding to a planar shape of the rear package tray. Its surface on a side of rear windshield 2200 is finished to be white or mirrored so as to easily reflect infrared rays.

Figure 7:
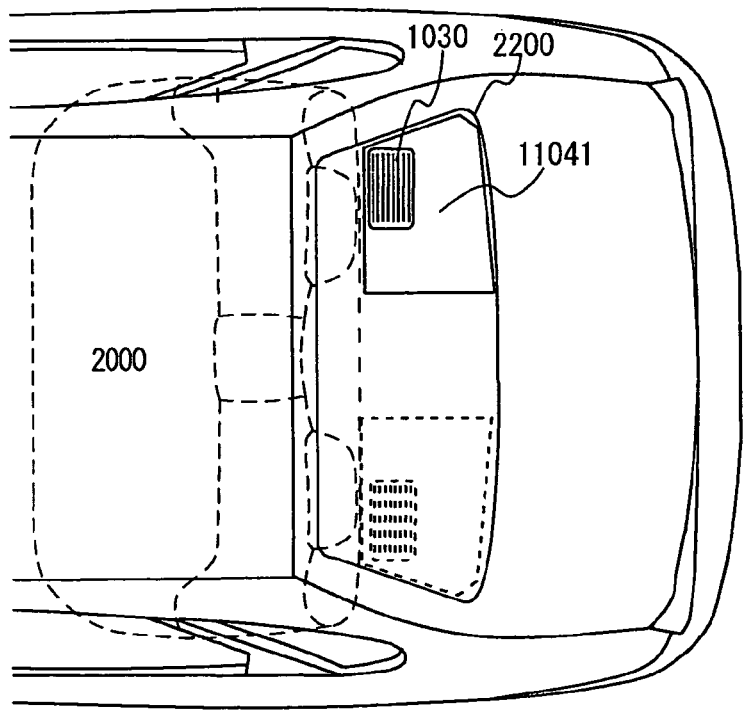

Furthermore, as shown in FIGS. 5 and 7, a reflector plate 11041 may be provided only in proximity to intake port 1030 at the rear package tray. Reflector plate 11041 is also a plate-like member similar to reflector plate 11040, and its surface on a side of rear windshield 2200 is finished to be white or mirrored so as to easily reflect infrared rays.

As shown in FIGS. 6 and 7 by a solid line, inlet port 1030 may be provided only on the right side with respect to a heading direction of the vehicle. As shown in FIGS. 6 and 7 by a dotted line, inlet port 1030 may be provided only on the left side with respect to the heading direction of the vehicle. Furthermore, inlet ports 1030 may be provided on the right side and the left side with respect to the heading direction of the vehicle. Furthermore, the number of inlet ports 1030 is not limited to one or two.

There will be described an operation of cooling device 11000 for the vehicle according to the present embodiment based on the above-described structure.

For example, if the vehicle is brought into the READY-ON state, the temperature of secondary battery 1010, namely, battery temperature TH (BA) is sensed. If temperature TH (BA) is higher than the predetermined cooling required temperature (and if the battery cooling fan motor does not operate), an operation command signal is output to the battery cooling fan motor, so that battery cooling fan 1012 is operated.

If battery cooling fan 1012 is in operation under the scorching sun during the day in midsummer, for example, intense solar radiation impinges upon the rear package tray through rear windshield 2200. Even in such a case, reflector plate 11040 or reflector plate 11041 reflects infrared light and reduces an amount of infrared rays to be absorbed, so that it is possible to suppress a temperature rise in the vehicle interior in proximity to air intake port 1030. Therefore, it is possible to avoid a significant temperature rise of the cooling airflow to be supplied to secondary battery 1010.

As described above, with the cooling device for the vehicle according to the present embodiment, even if the air intake port is provided in proximity to the rear windshield and is under the effect of solar radiation, it is possible to reduce the effect of solar radiation and avoid a significant temperature rise of the cooling airflow, and efficiently cool the electrical apparatus mounted on the rear side of the vehicle.

It should be understood that the embodiments disclosed herein are illustrative and not limitative in all aspects. The scope of the present invention is shown not by the description above but by the scope of the claims, and is intended to include all modifications within the equivalent meaning and scope of the claims.

The invention claimed is:

1. A cooling device for an electrical apparatus mounted on a vehicle, the electrical apparatus being mounted at a rear side of the vehicle, the cooling device comprising:
   a cooling airflow intake port which is provided in the vehicle interior adjacent to a lower section of a rear windshield;
   a supply unit which supplies a cooling airflow through said cooling airflow intake port to said electrical apparatus;
   a blocking unit that is configured to block solar radiation incident on and transmitted through said rear windshield from coming onto said cooling airflow intake port; and
   a control unit which, if said supply unit supplies the cooling airflow to said electrical apparatus, controls said blocking unit based on at least one of an intensity of the solar radiation coming onto said cooling airflow intake port and a temperature of the cooling airflow.

2. The cooling device according to claim 1, wherein
   said blocking unit comprises said rear windshield made of light control glass, an amount of infrared light transmitting through the light control glass being controllable, and
   said control unit controls the amount of the infrared light transmitting through said light control glass based on at least one of the intensity of the solar radiation coming onto said cooling airflow intake port and the temperature of the cooling airflow.

3. The cooling device according to claim 2, wherein said vehicle is a hybrid vehicle.

4. The cooling device according to claim 1, wherein said electrical apparatus is a power storage mechanism.

5. The cooling device according to claim 4, wherein said vehicle is a hybrid vehicle.

6. The cooling device according to claim 1, wherein said electrical apparatus is a semiconductor element for power conversion.

7. The cooling device according to claim 6, wherein said vehicle is a hybrid vehicle.

8. The cooling device according to claim 1, wherein said cooling airflow intake port is provided at a rear package tray.

9. The cooling device according to claim 8, wherein said vehicle is a hybrid vehicle.

10. The cooling device according to claim 1, wherein said vehicle is a hybrid vehicle.

* * * * *